US012114269B2

(12) United States Patent
Bai et al.

(10) Patent No.: US 12,114,269 B2
(45) Date of Patent: Oct. 8, 2024

(54) UPLINK POWER CONTROL TECHNIQUES FOR FULL-DUPLEX COMMUNICATION

(71) Applicant: QUALCOMM Incorporated, San Diego, CA (US)

(72) Inventors: Tianyang Bai, Somerville, NJ (US); Junyi Li, Chester, NJ (US); Hua Wang, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/092,942

(22) Filed: Nov. 9, 2020

(65) Prior Publication Data

US 2022/0150837 A1    May 12, 2022

(51) Int. Cl.
*H04W 52/14*  (2009.01)
*H04L 5/00*  (2006.01)
*H04W 72/23*  (2023.01)

(52) U.S. Cl.
CPC ......... *H04W 52/146* (2013.01); *H04L 5/0048* (2013.01); *H04W 72/23* (2023.01)

(58) Field of Classification Search
CPC . H04W 72/042; H04W 52/146; H04W 52/08; H04W 52/143; H04L 5/0048; H04L 7/0617
USPC ...................... 455/522, 69, 452.1, 452.2, 509
See application file for complete search history.

(56) References Cited

U.S. PATENT DOCUMENTS

| | | | |
|---|---|---|---|
| 7,003,310 B1* | 2/2006 | Youssefmir | H04B 7/0617 455/67.11 |
| 10,356,723 B2* | 7/2019 | Noh | H04W 52/08 |
| 2014/0078939 A1 | 3/2014 | Shirani-Mehr et al. | |
| 2014/0185481 A1* | 7/2014 | Seol | H04W 52/24 370/252 |
| 2016/0150490 A1* | 5/2016 | Ouchi | H04W 72/0446 455/522 |
| 2017/0034785 A1* | 2/2017 | Suzuki | H04W 52/08 |
| 2020/0229112 A1* | 7/2020 | John Wilson | H04W 52/28 |

(Continued)

FOREIGN PATENT DOCUMENTS

| WO | WO-2020067828 A1 | 4/2020 |
|---|---|---|
| WO | WO-2020222458 A1 | 11/2020 |

OTHER PUBLICATIONS

International Search Report and Written Opinion—PCT/US2021/071747—ISA/EPO—Jan. 27, 2022.

*Primary Examiner* — John J Lee
(74) *Attorney, Agent, or Firm* — Arun Swain

(57) ABSTRACT

This disclosure provides systems, methods, and apparatuses, including computer programs encoded on computer storage media, for wireless communication. In one aspect, a user equipment (UE) is configured to set a transmission power for an uplink communication based, at least in part, on a downlink communication. The UE is further configured to perform the uplink communication based, at least in part, on the set transmission power while concurrently performing the downlink communication. For example, in some aspects, the transmission power for the uplink communication may be set based on the type of downlink communication or based on one or more parameters associated with the downlink communication. In additional aspects, an algorithm may be used to set the transmission power for the uplink communication.

27 Claims, 5 Drawing Sheets

(56) References Cited

U.S. PATENT DOCUMENTS

2021/0219246 A1\* 7/2021 Xu ..................... H04L 1/1819
2022/0141852 A1\* 5/2022 Zhang ................. H04L 5/0057
370/329

\* cited by examiner

UPLINK POWER CONTROL TECHNIQUES FOR FULL-DUPLEX COMMUNICATION

TECHNICAL FIELD

Aspects of the present disclosure relate generally to wireless communication systems, and more particularly, but without limitation, to uplink power control techniques for full-duplex communication.

DESCRIPTION OF THE RELATED TECHNOLOGY

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the third ($3^{rd}$) Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication. The method includes setting a transmission power for an uplink communication based, at least in part, on a downlink communication. The method further includes performing the uplink communication based, at least in part, on the set transmission power while concurrently performing the downlink communication. In some implementations, the transmission power for the uplink communication can be set based, at least in part, on one or more parameters associated with the downlink communication.

In some implementations of the innovative method for wireless communication described above, the downlink communication can include at least one of: communication of data via a physical downlink shared channel (PDSCH); communication of control information via a physical downlink control channel (PDCCH); communication of a channel state information reference signal (CSI-RS); communication of a synchronization signal block (SSB); or communication of a tracking reference signal (TRS). In additional implementations of the innovative method for wireless communication described above, the one or more parameters can include at least one of: an indication of self-interference; a modulation and coding scheme (MCS); a number of data streams; a slot aggregation repetition factor; an indication of how many times a message part of the downlink communication is repeated; a frequency resource aggregation level; a downlink control information (DCI) format; a density of allocated frequency resources; an indication of frequency separation between frequency resources allocated for the downlink communication and frequency resources allocated for the uplink communication; an indication of a time-domain overlap between the downlink communication and the uplink communication; or a scaling factor associated with a transport block size associated with the downlink communication. In some implementations of the innovative method for wireless communication described above, an algorithm can be used to set the transmission power for the uplink communication, and each of at least one variable of the algorithm can be a function of a type of the downlink communication. In some implementations of the innovative method for wireless communication described above, the transmission power for the uplink communication can be set based, at least in part, on one or more parameters associated with the downlink communication. According to some implementations of the innovative method for wireless communication described above, an algorithm can be used to set the transmission power for the uplink communication, and each of at least one variable of the algorithm can be a function of at least one of the one or more parameters. In some implementations of the innovative method for wireless communication described above, a variable of the at least one variable of the algorithm can be a function of an MCS associated with the downlink communication and an MCS associated with the uplink communication. According to some implementations of the innovative method for wireless communication described above, the uplink communication can at least partially overlap in time with the downlink communication when concurrently performed with the downlink communication.

Another innovative aspect of the subject matter described in this disclosure can be implemented in an apparatus configured for wireless communication. The apparatus includes means for setting a transmission power for an uplink communication based, at least in part, on a downlink communication. The apparatus further includes means for performing the uplink communication based, at least in part, on the set transmission power while concurrently performing the downlink communication.

According to some aspects, the apparatus configured for wireless communication can be implemented to perform any of the innovative method aspects described above. For example, in some implementations of the innovative apparatus configured for wireless communication described above, the downlink communication can include at least one of: communication of data via a PDSCH; communication of control information via a PDCCH; communication of a CSI-RS; communication of a SSB; or communication of a TRS. In additional implementations of the innovative apparatus configured for wireless communication described above, the one or more parameters can include at least one of: an indication of self-interference; a MCS; a number of data streams; a slot aggregation repetition factor; an indication of how many times a message part of the downlink communication is repeated; a frequency resource aggregation level; a DCI format; a density of allocated frequency resources; an indication of frequency separation between frequency resources allocated for the downlink communication and frequency resources allocated for the uplink communication; an indication of a time-domain overlap between the downlink communication and the uplink communication; or a scaling factor associated with a transport block size associated with the downlink communication. In some implementations of the innovative apparatus configured for wireless communication described above, an algorithm can be used to set the transmission power for the uplink communication, and each of at least one variable of the algorithm can be a function of a type of the downlink communication. In some implementations of the innovative apparatus configured for wireless communication described above, the transmission power for the uplink communication can be set based, at least in part, on one or more parameters associated with the downlink communication. According to some implementations of the innovative apparatus configured for wireless communication described above, an algorithm can be used to set the transmission power for the uplink communication, and each of at least one variable of the algorithm can be a function of at least one of the one or more parameters. In some implementations of the innovative apparatus configured for wireless communication described above, a variable of the at least one variable of the algorithm can be a function of an MCS associated with the downlink communication and an MCS associated with the uplink communication. According to some implementations of the innovative apparatus configured for wireless communication described above, the uplink communication can at least partially overlap in time with the downlink communication when concurrently performed with the downlink communication.

Another innovative aspect of the subject matter described in this disclosure can be implemented in a non-transitory computer-readable medium storing instructions that, when executed by a processor, cause the processor to perform operations including setting a transmission power for an uplink communication based, at least in part, on a downlink communication. The operations further include performing the uplink communication based, at least in part, on the set transmission power while concurrently performing the downlink communication.

According to some aspects, the non-transitory computer-readable medium can be implemented to perform any of the innovative method aspects described above. For example, in some implementations of the innovative non-transitory computer-readable medium described above, the downlink communication can include at least one of: communication of data via a PDSCH; communication of control information via a PDCCH; communication of a CSI-RS; communication of a SSB; or communication of a TRS. In additional implementations of the innovative non-transitory computer-readable medium described above, the one or more parameters can include at least one of: an indication of self-interference; a MCS; a number of data streams; a slot aggregation repetition factor; an indication of how many times a message part of the downlink communication is repeated; a frequency resource aggregation level; a DCI format; a density of allocated frequency resources; an indication of frequency separation between frequency resources allocated for the downlink communication and frequency resources allocated for the uplink communication; an indication of a time-domain overlap between the downlink communication and the uplink communication; or a scaling factor associated with a transport block size associated with the downlink communication. In some implementations of the innovative non-transitory computer-readable medium described above, an algorithm can be used to set the transmission power for the uplink communication, and each of at least one variable of the algorithm can be a function of a type of the downlink communication. In some implementations of the innovative non-transitory computer-readable medium described above, the transmission power for the uplink communication can be set based, at least in part, on one or more parameters associated with the downlink communication. According to some implementations of the innovative non-transitory computer-readable medium described above, an algorithm can be used to set the transmission power for the uplink communication, and each of at least one variable of the algorithm can be a function of at least one of the one or more parameters. In some implementations of the innovative non-transitory computer-readable medium described above, a variable of the at least one variable of the algorithm can be a function of an MCS associated with the downlink communication and an MCS associated with the uplink communication. According to some implementations of the innovative non-transitory computer-readable medium described above, the uplink communication can at least partially overlap in time with the downlink communication when concurrently performed with the downlink communication.

Another innovative aspect of the subject matter described in this disclosure can be implemented in an apparatus configured for wireless communication. The apparatus includes a processing system configured to set a transmission power for an uplink communication based, at least in part, on a downlink communication. The apparatus also includes an interface configured to perform the uplink communication based, at least in part, on the set transmission power while concurrently performing the downlink communication.

According to some aspects, the apparatus configured for wireless communication can be implemented to perform any of the innovative method aspects described above. For example, in some implementations of the innovative apparatus configured for wireless communication described above, the downlink communication can include at least one of: communication of data via a PDSCH; communication of control information via a PDCCH; communication of a CSI-RS; communication of a SSB; or communication of a TRS. In additional implementations of the innovative apparatus configured for wireless communication described above, the one or more parameters can include at least one of: an indication of self-interference; a MCS; a number of data streams; a slot aggregation repetition factor; an indication of how many times a message part of the downlink communication is repeated; a frequency resource aggregation level; a DCI format; a density of allocated frequency resources; an indication of frequency separation between frequency resources allocated for the downlink communication and frequency resources allocated for the uplink communication; an indication of a time-domain overlap between the downlink communication and the uplink communication; or a scaling factor associated with a transport block size associated with the downlink communication. In some implementations of the innovative apparatus configured for wireless communication described above, an algorithm can be used to set the transmission power for the uplink communication, and each of at least one variable of the algorithm can be a function of a type of the downlink communication. In some implementations of the innovative apparatus configured for wireless communication described above, the transmission power for the uplink communication can be set based, at least in part, on one or more parameters associated with the downlink communication. According to some implementations of the innovative apparatus configured for wireless communication described above, an algorithm can be used to set the transmission power for the uplink communication, and each of at least one variable of the algorithm can be a function of at least one of the one or more parameters. In some implementations of the innovative apparatus configured for wireless communication described above, a variable of the at least one variable of the algorithm can be a function of an MCS associated with the downlink communication and an MCS associated with the uplink communication. According to some implementations of the innovative apparatus configured for wireless communication described above, the uplink communication can at least partially overlap in time with the downlink communication when concurrently performed with the downlink communication.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
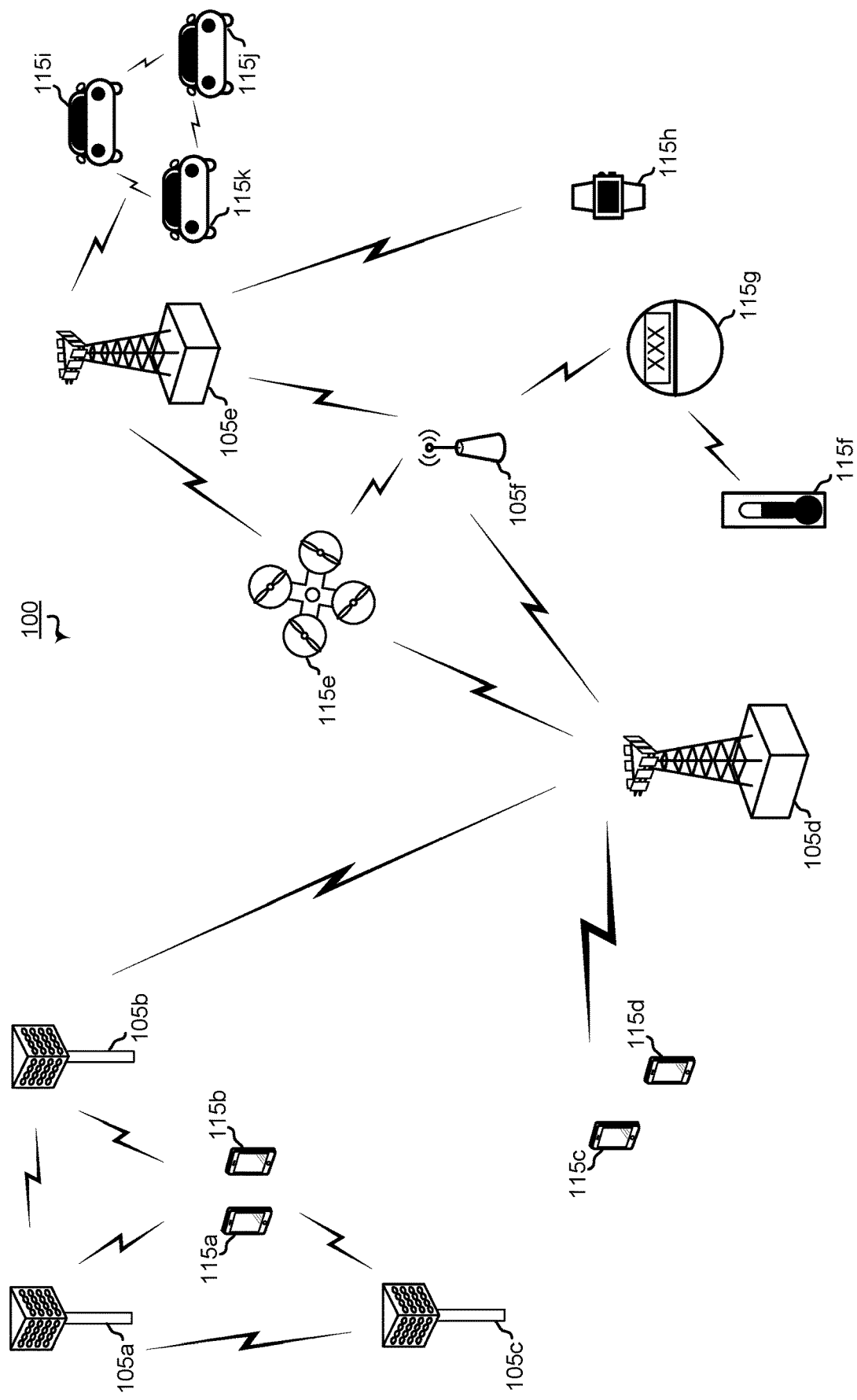
FIG. 1 is a block diagram illustrating details of an example wireless communication system.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

The present disclosure provides systems, apparatus, methods, and computer-readable media for utilizing uplink power control techniques to account for self-interference and improve full-duplex wireless communication. In some implementations, a user equipment (UE) may be configured to perform full-duplex wireless communication. As an example, a UE may be configured to transmit information on an uplink at the same time that the UE receives information on a downlink. In such a full-duplex communication scenario, the uplink communication performed by the UE may interfere with the downlink communication concurrently performed by the UE. This type of interference may be referred to as self-interference. According to some aspects, self-interference may be a significant limitation to the use of full-duplex wireless communication. For example, in addition to interference created by other devices in a network, a UE may itself be the source of interference experienced by the UE when performing wireless communication. As such, self-interference may yield unfavorable operations in some instances or less-than-optimal wireless communication characteristics.

In some implementations, aspects of this disclosure may be utilized to account for self-interference and improve full-duplex wireless communication. For example, uplink power control techniques may be utilized to account for self-interference and improve full-duplex wireless communication. In some aspects, uplink power control techniques may include a UE setting a transmission power for an uplink communication based, at least in part, on a downlink communication. As an example, different parameters associated with downlink communication may be used to set the transmission power for uplink communication when the type of downlink communication is different. In some aspects, the transmission power for the uplink communication may be set based, at least in part, on one or more parameters associated with the downlink communication.

According to some aspects, an algorithm may be used to set the transmission power for the uplink communication. In some aspects, each of at least one variable of the algorithm may be a function of a type of the downlink communication.

In additional aspects, each of at least one variable of the algorithm may be a function of at least one of the one or more parameters associated with the downlink communication. According to some aspects, a current algorithm may be modified so that additional parameters are added to the algorithm that are based on the type of downlink communication or based on one or more parameters associated with the downlink communication. In additional aspects, current parameters of an algorithm may be updated to be a function of at least one of the one or more parameters associated with the downlink communication. In some other aspects, a UE may use default values for various parameters of an algorithm used to set the transmission power for uplink communication when certain types of downlink communication are utilized instead of others. In some aspects, a UE may perform the uplink communication based, at least in part, on the set transmission power while concurrently performing the downlink communication.

Particular implementations of the subject matter described in this disclosure can be implemented to realize one or more of the following potential advantages. The present disclosure provides processes and techniques for utilizing uplink power control schemes to reduce the impact of self-interference on the downlink reception and improve the overall performance of full-duplex wireless communication. For example, by better managing the self-interference, full-duplex wireless communication may be more readily deployed. Enabling full-duplex wireless communication with effective self-interference management may enable an increase of the spectrum efficiency in a communication link, and as such, the throughput of the wireless networks may be improved. Further, utilizing uplink power control schemes to better control self-interference and improve full-duplex wireless communication may result in higher data rates, higher capacity, higher reliability, and lower latency. In some aspects, lower power device operations also may be achieved.

This disclosure relates generally to providing or participating in authorized shared access between two or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UNITS/GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UNITS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1 M nodes/km²), ultra-low complexity (such as ~10 s of bits/sec), ultra-low energy (such as ~10+ years of battery life), and deep coverage with the capability to reach challenging locations; (2) including mission-critical control with strong security to safeguard sensitive personal, financial, or classified information, ultra-high reliability (such as 99.9999% reliability), ultra-low latency (such as ~1 millisecond (ms)), and users with wide ranges of mobility or lack thereof; and (3) with enhanced mobile broadband including extreme high capacity (such as ~10 Tbps/km²), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device-to-device or peer-to-peer or ad hoc network arrangements, etc.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (such as MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100. A UE may be a machine specifically configured for connected communication, including machine type communication (MTC), enhanced MTC (eMTC), narrowband IoT (NB-IoT) and the like. The UEs 115e-115k illustrated in FIG. 1 are examples of various machines configured for communication that access 5G network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115e, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is reported to the network through the small cell base station 105f. The 5G network 100 may provide additional network efficiency through dynamic, low-latency TDD/FDD communications, such as in a vehicle-to-vehicle (V2V) mesh network between the UEs 115i-115k communicating with the macro base station 105e.

Figure 2:
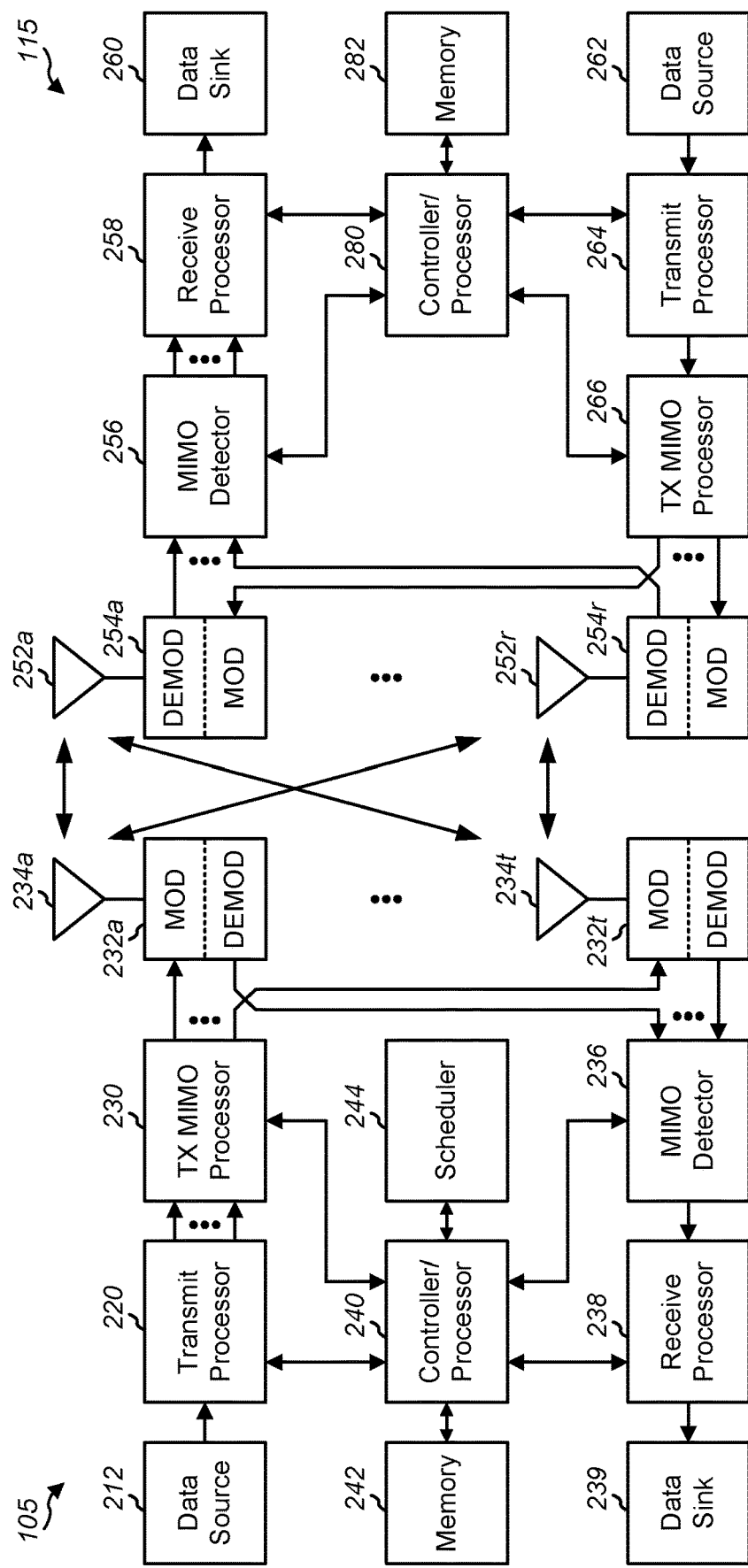
FIG. 2 is a block diagram conceptually illustrating an example design of a base station (BS) and a user equipment (UE).

FIG. 2 is a block diagram conceptually illustrating an example design of a base station (BS) 105 and a UE 115. The base station 105 and the UE 115 may be on e of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, etc., to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, etc., to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a controller/processor 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the controller/processor 280. Additionally, the transmit processor 264 may generate reference symbols for a reference signal. The symbols from the transmit processor 264 may be precoded by TX MIMO processor 266 if applicable, further processed by the modulators 254a through 254r (such as for SC-FDM, etc.), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the controller/processor 240.

The controllers/processors 240 and 280 may direct the operation at the base station 105 and the UE 115, respectively. The controller/processor 240 or other processors and modules at the base station 105 or the controller/processor 280 or other processors and modules at the UE 115 may perform or direct the execution of various processes for the techniques described herein, such as to perform or direct the execution illustrated in FIG. 3, or other processes for the techniques described herein. The memories 242 and 282 may store data and program codes for the base station 105 and the UE 115, respectively. The scheduler 244 may schedule UEs for data transmission on the downlink or uplink.

In some implementations, controller/processor 280 may be a component of a processing system.

A "processing system" may generally refer to a system or series of machines or components that receives inputs and processes the inputs to produce a set of outputs (which may be passed to other systems or components of, for example, the UE 115). For example, a "processing system of the UE 115" may refer to a system including the various other components or subcomponents of the UE 115.

The processing system of the UE 115 may interface with other components of the UE 115, and may process information received from other components (such as inputs or signals), output information to other components, etc. For example, a chip or modem of the UE 115 may include a processing system, a first interface configured to output, transmit or provide information, and a second interface configured to receive or obtain information. In some cases, the second interface may be an interface between the processing system of the chip or modem and a receiver, such that the UE 115 may receive information or signal inputs, and the information may be passed to the processing system. In some cases, the first interface may be an interface between the processing system of the chip or modem and a transmitter, such that the UE 115 may transmit information output from the chip or modem. A person having ordinary skill in the art will readily recognize that the second interface also may obtain or receive information or signal inputs, and the first interface also may output, transmit or provide information.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge/negative-acknowledge (ACK/NACK) feedback for its own transmitted packets as a proxy for collisions.

Network entity 105 and UE 115 may be configured to communicate via one or more portions of the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) as a "sub-6 GHz" band in various documents and articles. A similar nomenclature issue sometimes occurs with regard to FR2, which is often referred to (interchangeably) as a "mmWave" band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

In some aspects, a UE, such as the UE 115, may be configured to perform full-duplex wireless communication. For example, a UE may be configured to transmit information on an uplink at the same time that the UE receives information on a downlink. In some aspects, the frequency resources used to transmit information on an uplink may be different than the frequency resources used to receive information on a downlink.

According to some aspects, a UE may experience self-interference when performing full-duplex wireless communication, such as when the uplink communication performed by the UE interferes with the downlink communication concurrently performed by the UE. In some aspects, self-interference may be a significant limitation to the use of full-duplex wireless communication. For example, in some situations, self-interference from a transmission signal may be as strong as a received signal with cancelation techniques.

Aspects of this disclosure may be utilized to account for self-interference and improve full-duplex wireless communication. For example, uplink power control techniques disclosed herein may be utilized to account for self-interference and improve full-duplex wireless communication.

Figure 3:
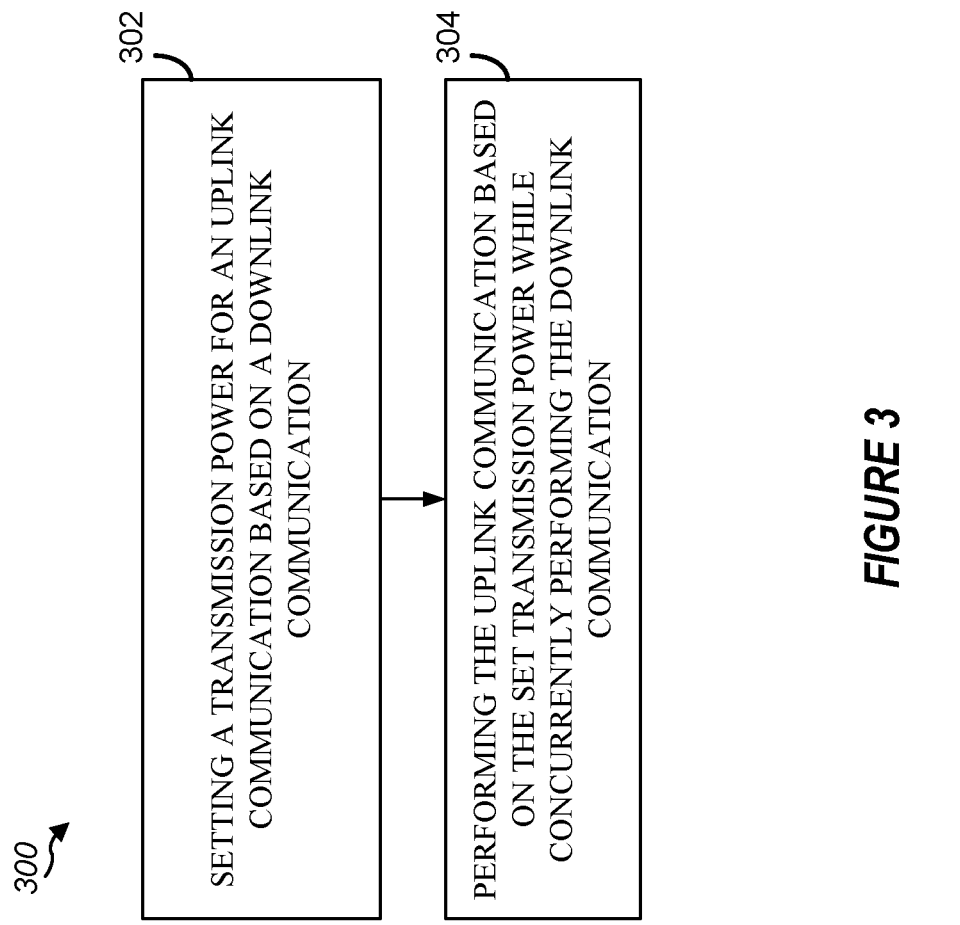
FIG. 3 is a flow diagram illustrating an example process of UE operations for wireless communication.
Figure 4:
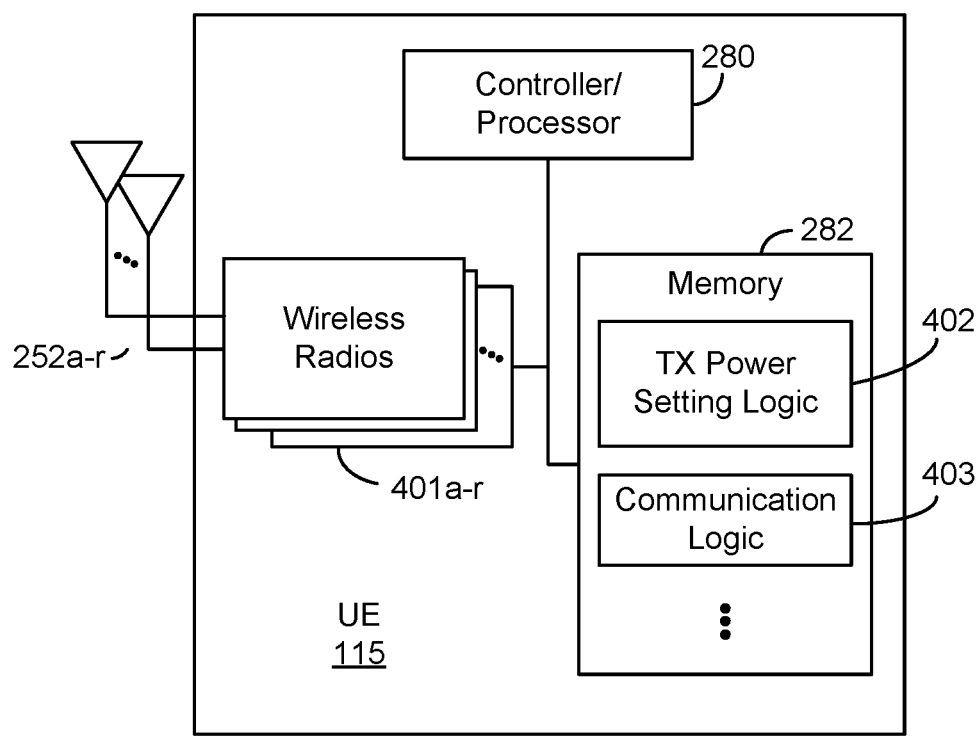
FIG. 4 is a block diagram conceptually illustrating an example design of a UE.

FIG. 3 is a flow diagram illustrating an example process 300 of UE operations for wireless communication. FIG. 3, as an example, provides an illustration showing how some aspects of the disclosure may be utilized to improve full-duplex wireless communication. For example, FIG. 3 illustrates how at least some of the uplink power control techniques of this disclosure may be utilized to reduce the impact of self-interference experienced while performing full-duplex wireless communication. The flow diagram illustrates an example process performed by a UE for wireless communication. For example, example blocks of the processes may cause the UE to perform uplink power control techniques for full-duplex communication according to some aspects of the present disclosure. The example blocks will also be described with respect to the UE 115 as illustrated in FIG. 4.

The example process 300 of UE operations for communication is shown in FIG. 3. In some implementations, the process 300 may be performed by the UE 115. In some other implementations, the process 300 may be performed by an apparatus configured for wireless communication. For example, the apparatus may include at least one processor, and a memory coupled to the processor. The processor may be configured to perform operations of the process 300. In some other implementations, the process 300 may be performed or executed using a non-transitory computer-readable medium having program code recorded thereon. The program code may be program code executable by a computer for causing the computer to perform operations of the process 300.

At block 302, a UE may set a transmission power for an uplink communication based, at least in part, on a downlink communication. For example, the UE may set a transmission power for uplink communication based, at least in part, on downlink communication scheduled to be performed concurrently with the uplink communication.

At block 304, the UE may perform the uplink communication based, at least in part, on the set transmission power while concurrently performing the downlink communication. For example, the transmission power used to transmit information, such as at block 304, on an uplink channel may be the transmission power set at block 302.

According to some aspects, the uplink communication and the downlink communication shown at blocks 302 and 304 may be part of full-duplex wireless communication performed by a UE. As such, the downlink communication may be scheduled to be performed concurrently with the uplink communication, and both the uplink communication and the downlink communication may be performed concurrently by the UE. In some aspects, such as when the UE concurrently performs the uplink communication and the downlink communication, the uplink communication may at least partially overlap in time with the downlink communication. For example, according to some aspects, the uplink communication and the downlink communication may overlap for the duration of at least one symbol in the time domain. In some implementations, a UE may experience more self-interference when there is more overlap in time, for example, more overlapping symbols, between the uplink communication and the downlink communication.

In some aspects, the downlink communication may include communication of data via a physical downlink shared channel (PDSCH). In additional aspects, the downlink communication may include communication of control information via a physical downlink control channel (PDCCH). According to some aspects, the downlink communication may include communication of a channel state information reference signal (CSI-RS). According to additional aspects, the downlink communication may include communication of a synchronization signal block (SSB). In additional aspects, the downlink communication may include communication of a tracking reference signal (TRS). In some aspects, the downlink communication may include at least one of the foregoing types of downlink communication.

According to some aspects, as shown at block 302, transmission power for uplink communication may be set based on downlink communication, such as downlink communication scheduled to be performed concurrently with uplink communication. For example, in some aspects, the transmission power for uplink communication may be different when the downlink communication includes communication of data via a PDSCH than when the downlink communication includes communication of control information via a PDCCH. As an example, different parameters associated with downlink communication may be used to set the transmission power for uplink communication when downlink communication is different. In particular, according to some aspects, a first set of parameters may be used to set the transmission power for uplink communication when a first type of downlink communication is utilized, and a different second set of parameters may be used to set the transmission power for uplink communication when a different second type of downlink communication is utilized.

In some aspects, a UE may set the transmission power for the uplink communication based, at least in part, on one or more parameters associated with the downlink communication. According to some aspects, the one or more parameters may include an indication of self-interference, such as an indication of self-interference associated with the UE. According to additional aspects, the one or more parameters may include a modulation and coding scheme (MCS), such as an MCS used for downlink communication. According to other aspects, the one or more parameters may include a number of data streams, such as a rank value that is indicative of a number of data streams used at the same time for downlink communication. In some aspects, the one or more parameters may include a slot aggregation repetition factor. In some aspects, the slot aggregation repletion factor may specify how many times a slot is repeated. In additional aspects, the one or more parameters may include an indication of how many times a message part, such as MSG2, of the downlink communication is repeated. According to some aspects, the one or more parameters may include a frequency resource aggregation level. In some aspects, the frequency resource aggregation level may provide an indication of how many frequency resources are allocated for a same downlink control information (DCI) payload. According to additional aspects, the one or more parameters may include a DCI format. For example, the DCI format may be a fallback DCI format, which may be a shortened version of a full DCI format. According to other aspects, the one or more parameters may include a density of allocated frequency resources. In additional aspects, the one or more parameters may include an indication of frequency separation between frequency resources allocated for the downlink communication and frequency resources allocated for the uplink communication.

According to additional aspects, the one or more parameters may include an indication of a time-domain overlap between the downlink communication and the uplink communication. For example, the time-domain overlap indication may provide an indication of a fraction, where the numerator may be representative of the overlapping time period, for example, a number of overlapping symbol time periods, and the denominator may be representative of the total time period allocated or used for downlink communication, for example, a total number of downlink symbol time periods associated with the downlink communication. In additional aspects, the one or more parameters may include a scaling factor associated with a transport block size associated with the downlink communication. For example, the scaling factor may be a factor used to determine a transport block size, such as the number of information bits in a transport block, of the downlink communication. In some aspects, the one or more parameters may include at least one of the foregoing parameters associated with downlink communication.

According to some aspects, an algorithm may be used to set the transmission power for the uplink communication. In other words, setting a transmission power for uplink communication, such as at block 302 of FIG. 3, may include a UE using an algorithm to set the transmission power for uplink communication. An algorithm that may be used as a starting point for setting a transmission power for uplink communication may be represented as:

$P_{\text{O\_PUSCH},b,f,c}$ $$(i, j, q_\delta, l) = \min \begin{Bmatrix} P_{CMAX,f,c}(i), \\ P_{\text{O\_PUSCH},b,f,c}(j) + 10\log_{10}\left(2^\mu \cdot M^{PUSCH}_{M_{b,f,c}}(i)\right) + \\ \alpha_{b,j,c}(j) \cdot PL_{b,f,s}(q_\delta) + \Delta_{TFb,f,s}(i) + f_{b,j,c}(i, j) \end{Bmatrix} [dBm] \quad (1)$$

In some aspects, equation (1) may represent an algorithm that may be used as a starting point for setting the transmission power for wireless communication performed via a physical uplink shared channel (PUSCH). According to some aspects, $P_{cmax}$ in equation (1) may be a maximum transmission power allowed for a UE. In some aspects, $P_{O\_PUSCH}$, or $P_O$ in general, may be a baseline power offset from which power may be increased based on other parameters in equation (1). According to some aspects, PL may be a path loss associated with a communication channel used for downlink or uplink communication. In some aspects, PL may be measured based on a downlink reference signal. For example, according to some aspects, for each uplink transmission, a UE may use a downlink signal, such as path loss reference signal, to measure the path loss of the downlink signal. In some aspects, another reference signal, such as a self-interference path loss reference signal, may be used to measure the strength of self-interference from one uplink beam to a downlink beam. In some aspects, a may provide an indication of how much the UE should compensate for path loss. For example, if α is 1, a UE may compensate for the full path loss amount by increasing transmission power accordingly. According to some aspects, Δ may be a term related to uplink MCS. For example, in some aspects, if information is being transmitted with higher MCS, then power may need to be increased. According to some aspects, f may be a term used to provide additional uplink transmission power adjustments. In some aspects, f may be related to a transmission power control (TPC) field in DCI. According to some aspects, M in equation (1) may refer to a bandwidth associated with a PUSCH. In some aspects, one or more of the foregoing parameters of equation (1) may be at least one of configured by a base station or defined by a wireless communication standard or specification.

A person of ordinary skill in the art will readily recognize that equation (1) is just one example of an algorithm that can be used as a starting point for setting a transmission power for uplink communication and that can be modified as described herein to incorporate aspects of this disclosure. In some aspects, other algorithms may be used for other uplink wireless communication channels. For example, wireless communication standards, such as 3GPP TS 36.213 and 3GPP TS 38.213, may provide other algorithms for other types of uplink wireless communication, such as wireless communication associated with PUCCH, sounding reference signals, or physical random access channels. According to some aspects, such other algorithms also may be modified as described herein to incorporate aspects of this disclosure.

In some aspects, each of at least one variable of an algorithm used to set the transmission power for uplink communication may be a function of the type of the downlink communication. In additional aspects, each of at least one variable of an algorithm used to set the transmission power for uplink communication may be a function of at least one of the one or more parameters associated with the downlink communication. In general, in some aspects, the transmission power for uplink communication may be a function of a configuration of downlink communication.

As an example with reference to equation (1), in some aspects, at least one variable of equation (1) may be a function of the type of the downlink communication. In additional aspects, at least one variable of equation (1) may be a function of at least one of the one or more parameters associated with the downlink communication.

In some aspects, an algorithm used to set the transmission power for uplink communication, such as equation (1), may be modified to take into account parameters associated with different types of downlink communication, such as downlink communication that includes communication of data via a PDSCH or that includes communication of control information via a PDCCH. For example, in some aspects, when the algorithm is a function of MCS associated with downlink communication, the algorithm may cause the transmission power for uplink communication to be decreased as the MCS is increased, for example, because the downlink communication may be less robust to self-interference as the MCS is increased.

According to some aspects, when the algorithm is a function of a number of data streams associated with downlink communication, such as a rank value, the algorithm may cause the transmission power for uplink communication to be decreased as the rank value is increased, for example, because the downlink communication may have less diversity and therefore may be less robust to self-interference as the rank is increased. In some aspects, when the algorithm is a function of a slot aggregation repetition factor associated with downlink communication, the algorithm may cause the transmission power for uplink communication to be increased as the slot aggregation repetition factor is increased, for example, because the downlink communication may be more robust to self-interference as the slot aggregation repetition factor is increased.

According to some aspects, when the algorithm is a function of an indication of how many times a message part of the downlink communication is repeated, the algorithm may cause the transmission power for uplink communication to be increased as the message repetition indication is increased, for example, because the downlink communication may be more robust to self-interference as the message repetition indication is increased. In some aspects, when the algorithm is a function of a frequency resource aggregation level associated with downlink communication, the algorithm may cause the transmission power for uplink communication to be increased as the frequency resource aggregation level is increased, for example, because the downlink communication may be more robust to self-interference as the frequency resource aggregation level is increased.

According to some aspects, when the algorithm is a function of a DCI format associated with downlink communication, the algorithm may cause the transmission power for uplink communication to be increased when a fallback DCI format is used instead of a full DCI format, for example, because the fallback DCI format may have a lower payload and downlink communication may be more robust to self-interference when a fallback DCI format is used instead of the full DCI format. In some aspects, when the algorithm is a function of an indication of frequency separation between frequency resources allocated for the downlink communication and frequency resources allocated for the uplink communication, the algorithm may cause the transmission power for uplink communication to be increased as the frequency separation is increased, for example, because the downlink communication may be more robust to self-interference as the frequency separation is increased.

According to some aspects, when the algorithm is a function of an indication of a time-domain overlap between the downlink communication and the uplink communication, the algorithm may cause the transmission power for uplink communication to be decreased as the time-domain overlap is increased, for example, because the downlink communication may be less robust to self-interference as the time-domain overlap is increased. In some aspects, when the algorithm is a function of a scaling factor associated with a downlink communication transport block size, the algorithm may cause the transmission power to be increased as the scaling factor is decreased, for example, because the downlink communication may be more robust to self-interference as the scaling factor is decreased.

According to some aspects, a UE may use default values for various parameters of an algorithm used to set the transmission power for uplink communication when certain types of downlink communication are utilized instead of others. For example, in an aspect of the disclosure, when some types of downlink communication are utilized for full-duplex communication, such as downlink communication that includes communication of a SSB, a UE may use default values for various parameters of an algorithm used to set the transmission power for uplink communication. As an example, the default parameter values may be parameters that are utilized for other downlink communication scenarios, such as parameter values used when downlink communication that includes communication of data via a PDSCH is configured with a certain MCS, such as MCS0.

In some aspects, setting a transmission power for uplink communication based on the type of downlink communication or based on one or more parameters associated with the downlink communication may be performed in a variety of ways. For example, in some aspects, a current algorithm, such as equation (1), may be modified so that additional parameters are added to the algorithm that are based on the type of downlink communication or based on one or more parameters associated with the downlink communication. As an example, an additional maximum power parameter may be added to the algorithm. In some aspects, the additional maximum power parameter may specify the maximum transmission power that can be used for uplink communication when measured self-interference has a specific value or a range of specific values. In some aspects, the additional maximum power parameter may be a function of self-interference alone or self-interference and at least one of the one or more parameters associated with the downlink communication. As another example, an additional $\Delta$ parameter that is a function of downlink MCS may be added to the algorithm in addition to the $\Delta$ parameter already in equation (1) that is related to uplink MCS.

In additional aspects, rather than adding parameters to an algorithm, such as equation (1), the current parameters of an algorithm, such as equation (1), may be updated to be a function of at least one of the one or more parameters associated with the downlink communication. As one example, according to some aspects, the $\Delta$ parameter already in equation (1) may be updated to be a function of both uplink MCS and downlink MCS. Thus, in some aspects, a variable of an algorithm, such as equation (1), used to set the transmission power for uplink communication may be a function of an MCS associated with the downlink communication and an MCS associated with the uplink communication.

In some aspects, for example, as shown at block 304, a UE may perform uplink communication based, at least in part, on the set transmission power while concurrently performing downlink communication. For example, the transmission power used to transmit information on an uplink channel when performing full-duplex wireless communication, such as at block 304, may be the transmission power set based on the type of downlink communication, such as at block 302. In additional aspects, as described in this disclosure, the transmission power used to transmit information on an uplink channel when performing full-duplex wireless communication, such as at block 304, also may be the transmission power set based on one or more parameters associated with the downlink communication.

It is noted that one or more blocks (or operations) described with reference to FIG. 3 may be combined with one or more blocks (or operations) of another Figure. For example, one or more blocks (or operations) of FIG. 3 may be combined with one or more blocks (or operations) of another figure. As another example, one or more blocks of FIG. 3 may be combined with one or more blocks (or operations) of another of FIGS. 1, 2, 4, and 5. Additionally, or alternatively, one or more operations described above with reference to FIGS. 1-3 may be combined with one or more operations described with reference to FIGS. 4 and 5.

FIG. 4 is a block diagram conceptually illustrating an example design of a UE. The UE of FIG. 4 may be configured to perform uplink power control techniques for full-duplex communication. The UE 115 includes the structure, hardware, and components as illustrated for the UE 115 depicted and described in FIG. 2. For example, the UE 115 includes the controller/processor 280, which operates to execute logic or computer instructions stored in the memory 282, as well as controlling the components of the UE 115 that provide the features and functionality of the UE 115. The UE 115, under control of the controller/processor 280, transmits and receives signals via wireless radios 401a-r and the antennas 252a-r. The wireless radios 401a-r include various components and hardware, as illustrated in FIG. 2 for the UE 115, including the modulator/demodulators 254a-r, the MIMO detector 256, the receive processor 258, the transmit processor 264, and the TX MIMO processor 266.

As shown, memory 282 may include TX Power Setting Logic 402 and Communication Logic 403. In some aspects, portions of one or more of the components 402 and 403 may be implemented at least in part in hardware or software. In some implementations, at least one of the components 402 and 403 is implemented at least in part as software stored in a memory (such as memory 282). For example, portions of one or more of the components 402 and 403 can be implemented as non-transitory instructions or code executable by a processor (such as the controller 280) to perform the functions or operations of the respective component. The UE 115 may receive signals from or transmit signal to a one or more network entities, such as the base station 105, the network entity, a core network, a core network device, or a network entity as illustrated in FIG. 1.

Figure 5:
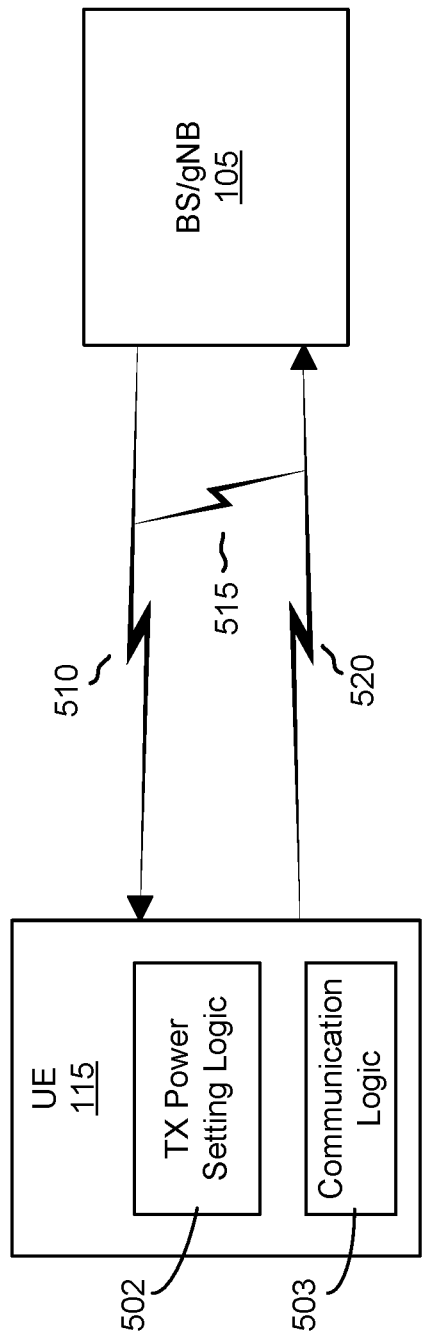
FIG. 5 is a block diagram conceptually illustrating example UE uplink power control operations for full-duplex communication.

FIG. 5 is a block diagram conceptually illustrating example UE uplink power control operations for full-duplex communication. In particular, in FIG. 5, a UE 115 and a base station 105 perform full-duplex wireless communication 510/520 according to some aspects of this disclosure. The full-duplex wireless communication 510/520 includes downlink communication 510 and uplink communication 520. According to some aspects, UE 115 may utilize Communication Logic 503, which may correspond to Communication Logic 403 of FIG. 4, to perform the full-duplex wireless communication 510/520. For example, UE 115 may utilize Communication Logic 503 to receive the downlink communication 510 and to transmit the uplink communication 520. In some aspects, the uplink communication 520 may interfere with the concurrently-operating downlink communication, creating self-interference 515.

The UE 115 may utilize uplink power control techniques to account for the self-interference 515 and improve the overall full-duplex wireless communication 510/520. As an example, in some aspects, UE 115 may utilize TX Power Setting Logic 502, which may correspond to TX Power Setting Logic 402 of FIG. 4, to set a transmission power for the uplink communication 520 based, at least in part, on the downlink communication 510. In some aspects, through the use of TX Power Setting Logic 502, UE 115 may set the transmission power for the uplink communication 520 based, at least in part, on at least one of the type of the downlink communication 510 or one or more parameters associated with the downlink communication 510. TX Power Setting Logic 502 may include an algorithm, such as equation (1), that may be used to set the transmission power for the uplink communication 520. In some aspects, each of at least one variable of the algorithm may be a function of a type of the downlink communication 510. In additional aspects, each of at least one variable of the algorithm may be a function of at least one of the one or more parameters associated with the downlink communication 510. In some aspects, UE 115 may perform the uplink communication 520 based, at least in part, on the transmission power set for the uplink communication 520 while concurrently performing the downlink communication 510.

In some aspects, uplink power control techniques for full-duplex communication may include an apparatus, such as a UE, setting a transmission power for an uplink communication based, at least in part, on a downlink communication. According to some aspects, the apparatus, such as a UE, also may perform the uplink communication based, at least in part, on the set transmission power while concurrently performing the downlink communication. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include an interface and a processor system coupled to the interface and configured to perform one or more operations. In some implementations, the apparatus may include one or more means configured to perform operations described herein.

In a first aspect, the downlink communication may include at least one of communication of data via a PDSCH; communication of control information via a PDCCH; communication of a CSI-RS; communication of a SSB; or communication of a TRS.

In a second aspect, alone or in combination with the first aspect, an algorithm may be used to set the transmission power for the uplink communication, and each of at least one variable of the algorithm may be a function of a type of the downlink communication.

In a third aspect, alone or in combination with one or more of the first through second aspects, the transmission power for the uplink communication may be set based, at least in part, on one or more parameters associated with the downlink communication.

In a fourth aspect, alone or in combination with one or more of the first through third aspects, the one or more parameters may include at least one of: an indication of self-interference; a MCS; a number of data streams; a slot aggregation repetition factor; an indication of how many times a message part of the downlink communication is repeated; a frequency resource aggregation level; a DCI format; a density of allocated frequency resources; an indication of frequency separation between frequency resources allocated for the downlink communication and frequency resources allocated for the uplink communication; an indication of a time-domain overlap between the downlink communication and the uplink communication; or a scaling factor associated with a transport block size associated with the downlink communication.

In a fifth aspect, alone or in combination with one or more of the first through fourth aspects, an algorithm may be used to set the transmission power for uplink communication, and each of at least one variable of the algorithm may be a function of at least one of the one or more parameters.

In a sixth aspect, alone or in combination with one or more of the first through fifth aspects, a variable of the at least one variable of the algorithm may be a function of an MCS associated with the downlink communication and an MCS associated with the uplink communication.

In a seventh aspect, alone or in combination with one or more of the first through sixth aspects, the uplink communication may at least partially overlap in time with the downlink communication when concurrently performed with the downlink communication.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication performed by a user equipment (UE), the method comprising:

adjusting a transmission power for an uplink communication in accordance with one or more parameters of a downlink communication, the one or more parameters including a first indication of self-interference and a second indication comprising at least one of the following:
- a number of times a message portion of the downlink communication is repeated;
- a type of the downlink communication including communication of a tracking reference signal (TRS); or
- downlink control information (DCI) format of the downlink communication corresponding to a fallback DCI format having a lower payload than a full DCI format; and performing the uplink communication concurrently while performing the downlink communication, the uplink communication performed using the adjusted transmission power.

2. The method of claim 1, wherein the one or more parameters further include a type of the downlink communication, and wherein the type of the downlink communication comprises:
- communication of data via a physical downlink shared channel (PDSCH);
- communication of control information via a physical downlink control channel (PDCCH); or
- communication of a synchronization signal block (SSB).

3. The method of claim 2, wherein adjusting the transmission power for the uplink communication includes using an algorithm to adjust the transmission power for the uplink communication, the algorithm being a function of the type of the downlink communication.

4. The method of claim 1, wherein the one or more parameters further include a rank value that indicates a number of data streams included in the downlink communication.

5. The method of claim 1, wherein adjusting the transmission power for the uplink communication includes using an algorithm to adjust the transmission power for the uplink communication, the algorithm being a function of a downlink control information (DCI) format of the downlink communication, the algorithm being configured to increase the transmission power for the uplink communication in response to the DCI format corresponding to a fallback DCI format, and the fallback DCI format being a shortened version of a full DCI format.

6. The method of claim 1, wherein adjusting the transmission power for the uplink communication includes using an algorithm to adjust the transmission power for the uplink communication, the algorithm being a function of a first modulation and coding scheme (MCS) associated with the downlink communication and a second MCS associated with the uplink communication.

7. The method of claim 1, wherein the uplink communication at least partially overlaps in time with the downlink communication when concurrently performed with the downlink communication.

8. The method of claim 1, wherein the one or more parameters further include an indication of frequency separation between frequency resources allocated for the downlink communication and frequency resources allocated for the uplink communication.

9. The method of claim 1, wherein the one or more parameters further include an indication of a time-domain overlap between the downlink communication and the uplink communication.

10. The method of claim 1, wherein the one or more parameters further include a scaling factor associated with a transport block size associated with the downlink communication.

11. The method of claim 1, wherein the one or more parameters further include a density of allocated frequency resources.

12. The method of claim 1, wherein the one or more parameters further include a slot aggregation repetition factor.

13. An apparatus configured for wireless communication, comprising:
- means for adjusting a transmission power for an uplink communication in accordance with one or more parameters of a downlink communication, the one or more parameters including a first indication of self-interference and a second indication comprising at least one of the following:
  - a number of times a message portion of the downlink communication is repeated;
  - a type of the downlink communication including communication of a tracking reference signal (TRS); or
  - downlink control information (DCI) format of the downlink communication corresponding to a fallback DCI format having a lower payload than a full DCI format; and
- means for performing the uplink communication concurrently while performing the downlink communication, the uplink communication performed using the adjusted transmission power.

14. The apparatus of claim 13, wherein the one or more parameters further include a type of the downlink communication, the type of the downlink communication comprising:
- communication of data via a physical downlink shared channel (PDSCH);
- communication of control information via a physical downlink control channel (PDCCH); or
- communication of a synchronization signal block (SSB.

15. The apparatus of claim 13, wherein the one or more parameters further include:
- a modulation and coding scheme (MCS);
- a number of data streams;
- a slot aggregation repetition factor;
- an indication of how many times a message part of the downlink communication is repeated;
- a frequency resource aggregation level;
- a density of allocated frequency resources;
- an indication of frequency separation between frequency resources allocated for the downlink communication and frequency resources allocated for the uplink communication;
- an indication of a time-domain overlap between the downlink communication and the uplink communication;
- a scaling factor associated with a transport block size associated with the downlink communication; or
- a combination thereof.

16. The apparatus of claim 13, wherein the means for adjusting the transmission power for the uplink communication is configured to use an algorithm to set the transmission power for the uplink communication, the algorithm being a function of a first modulation and coding scheme (MCS) associated with the downlink communication and a second MCS associated with the uplink communication.

17. The apparatus of claim 13, wherein the uplink communication at least partially overlaps in time with the downlink communication when concurrently performed with the downlink communication.

18. The apparatus of claim 13, wherein the one or more parameters further include a type of the downlink communication comprising communication of a synchronization signal block (SSB).

19. The apparatus of claim 13, wherein the one or more parameters further include a number of data streams.

20. The apparatus of claim 13, wherein the one or more parameters further include an indication of frequency separation between frequency resources allocated for the downlink communication and frequency resources allocated for the uplink communication.

21. A non-transitory computer-readable medium storing instructions that, when executed by a processor, cause the processor to perform operations comprising:
  adjusting a transmission power for an uplink communication in accordance with one or more parameters of a downlink communication, the one or more parameters including a first indication of self-interference and a second indication comprising at least one of the following:
    a number of times a message portion of the downlink communication is repeated;
    a type of the downlink communication including communication of a tracking reference signal (TRS); or
    downlink control information (DCI) format of the downlink communication corresponding to a fallback DCI format having a lower payload than a full DCI format; and
  performing the uplink communication concurrently while performing the downlink communication, the uplink communication performed using the adjusted transmission power.

22. The non-transitory computer-readable medium of claim 21, wherein the one or more parameters further include a type of the downlink communication, and wherein the type of the downlink communication comprises: communication of data via a physical downlink shared channel (PDSCH); communication of control information via a physical downlink control channel (PDCCH); or communication of a synchronization signal block (SSB).

23. The non-transitory computer-readable medium of, claim 21, wherein the one or more parameters further include:
  a modulation and coding scheme (MCS);
  a number of data streams;
  a slot aggregation repetition factor;
  an indication of how many times a message part of the downlink communication is repeated;
  a frequency resource aggregation level;
  a density of allocated frequency resources;
  an indication of frequency separation between frequency resources allocated for the downlink communication and frequency resources allocated for the uplink communication;
  an indication of a time-domain overlap between the downlink communication and the uplink communication; or
  a scaling factor associated with a transport block size associated with the downlink communication.

24. An apparatus configured for wireless communication, comprising:
  a processing system configured to adjust a transmission power for an uplink communication in accordance with one or more parameters of a downlink communication, the one or more parameters including a first indication of self-interference and a second indication comprising at least one of the following:
    a number of times a message portion of the downlink communication is repeated;
    a type of the downlink communication including communication of a tracking reference signal (TRS); or
    downlink control information (DCI) format of the downlink communication corresponding to a fallback DCI format having a lower payload than a full DCI format; and
  an interface configured to perform the uplink communication concurrently while performing the downlink communication, the uplink communication performed using the adjusted transmission power.

25. The apparatus of claim 24, wherein the one or more parameters further include a type of the downlink communication, the type of the downlink communication including:
  communication of data via a physical downlink shared channel (PDSCH);
  communication of control information via a physical downlink control channel (PDCCH); or
  communication of a synchronization signal block (SSB).

26. The apparatus of claim 24, wherein the one or more parameters further include a rank value indicative of a number of data streams included in the downlink communication.

27. The apparatus of claim 26, wherein the one or more parameters further include:
  a modulation and coding scheme (MCS);
  a number of data streams;
  a slot aggregation repetition factor;
  an indication of how many times a message part of the downlink communication is repeated;
  a frequency resource aggregation level;
  a density of allocated frequency resources;
  an indication of frequency separation between frequency resources allocated for the downlink communication and frequency resources allocated for the uplink communication;
  an indication of a time-domain overlap between the downlink communication and the uplink communication; and
  a scaling factor associated with a transport block size associated with the downlink communication.

* * * * *